United States Patent [19]

Sakai et al.

[11] Patent Number: 4,573,086
[45] Date of Patent: Feb. 25, 1986

[54] COLOR TELEVISION SIGNAL CONVERTING CIRCUIT

[75] Inventors: Tetsuro Sakai; Kazuhiko Honda, both of Fukaya, Japan

[73] Assignee: Tokyo Shibaura Denki Kabushiki Kaisha, Kawasaki, Japan

[21] Appl. No.: 476,402

[22] Filed: Mar. 17, 1983

[30] Foreign Application Priority Data

Mar. 19, 1982 [JP] Japan .................................. 57-42695

[51] Int. Cl.⁴ ............................................. H04N 9/42
[52] U.S. Cl. ..................................... 358/11; 358/330; 358/310
[58] Field of Search ..................... 358/11, 21, 30, 310, 358/330

[56] References Cited

U.S. PATENT DOCUMENTS 3,702,377  11/1972  Kerr et al. ............................. 358/11
3,917,415  11/1975  Eguchi ............................. 358/11 X
4,283,738  8/1981  Rutistiauser ......................... 358/11

FOREIGN PATENT DOCUMENTS 43-14286  6/1968  Japan .
52-54325  5/1977  Japan .................................... 358/11

Primary Examiner—Aristotelis M. Psitos
Attorney, Agent, or Firm—Cushman, Darby & Cushman

[57] ABSTRACT

In a video disc player system, the NTSC color TV signal is recorded on the video disc, of which carrier chroma signal has been lowered to e.g., 1.52 MHz, due to limitations on the available frequency band within this system. To reproduce this recorded TV signal by the PAL TV receiver, it is necessary to convert it into the corresponding standard PAL TV signal. To this end, the lower carrier chroma signal frequency is up-converted to the subcarrier one (4.43 MHz) of the PAL TV system. There are provided a doubler which can double a subcarrier signal frequency derived from a standard subcarrier generator, a DC source and an adder circuit in which the doubled subcarrier signal frequency (8.86 MHz) is added to the DC component under the given adding ratio so as to produce a modulating signal. The up-converted carrier chrominance signal is then modulated by the modulating signal. After filtering the modulated signal and adding it to the up-converted carrier chrominance signal under a given adding ratio, the resultant chrominance signal is combined with the luminance signal, resulting in a composite PAL color TV signal. The signal converting circuit of the invention can also by used to convert the PAL TV signal recorded on the video disc to the corresponding NTSC TV signal.

10 Claims, 15 Drawing Figures

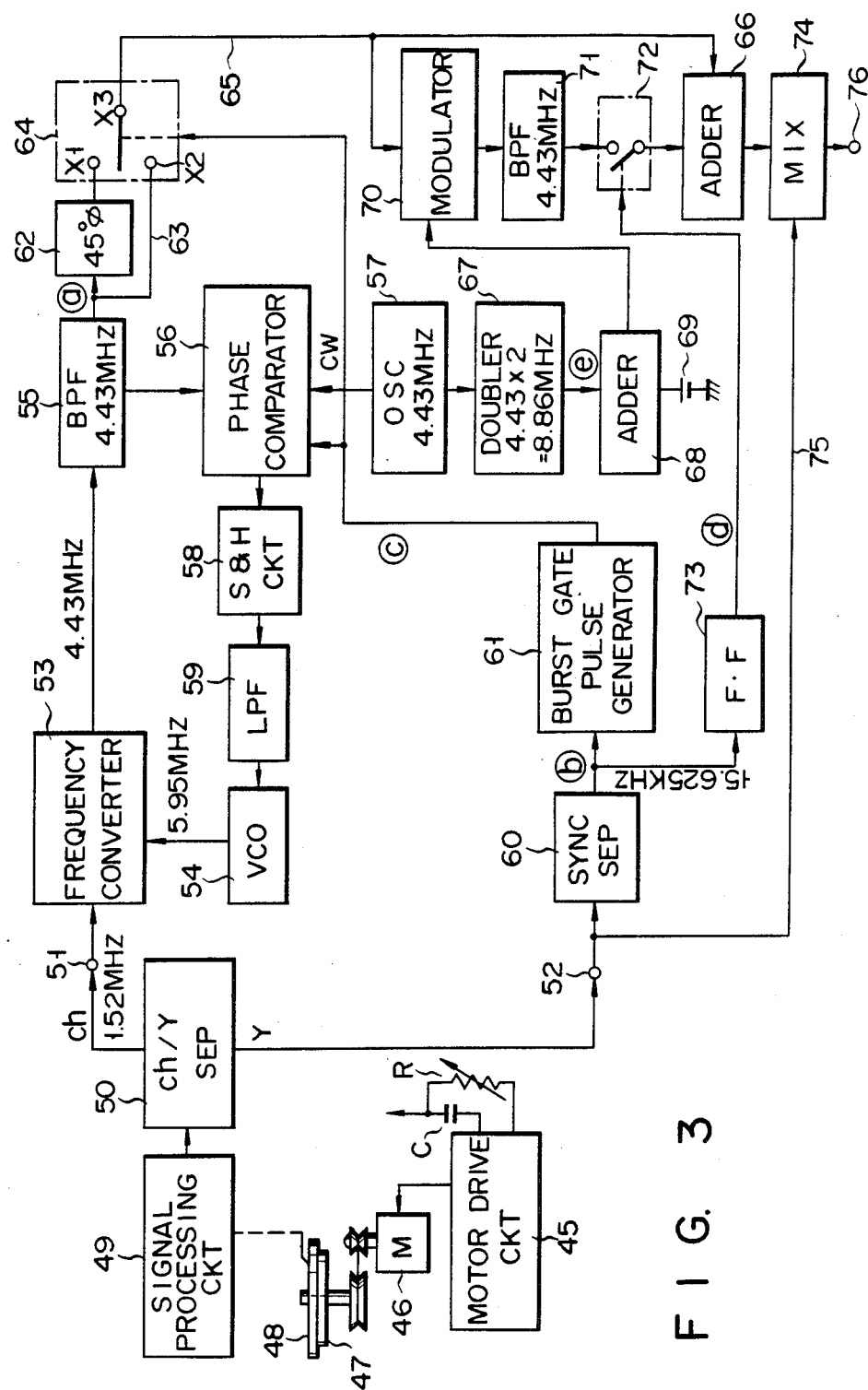
F I G. 3

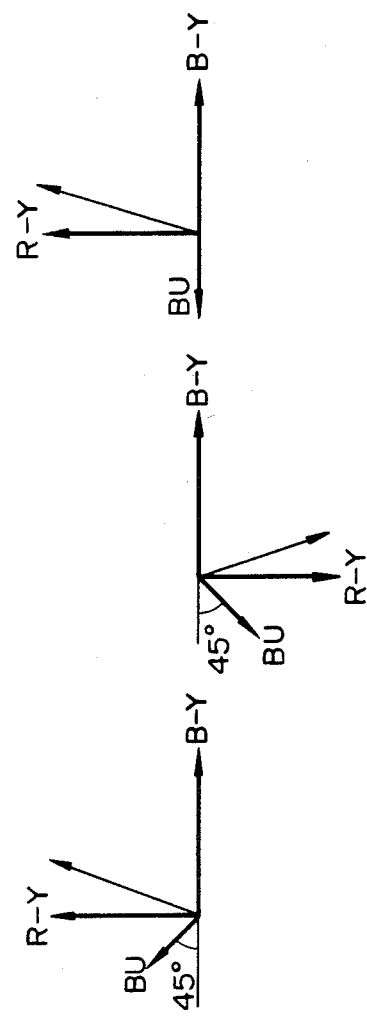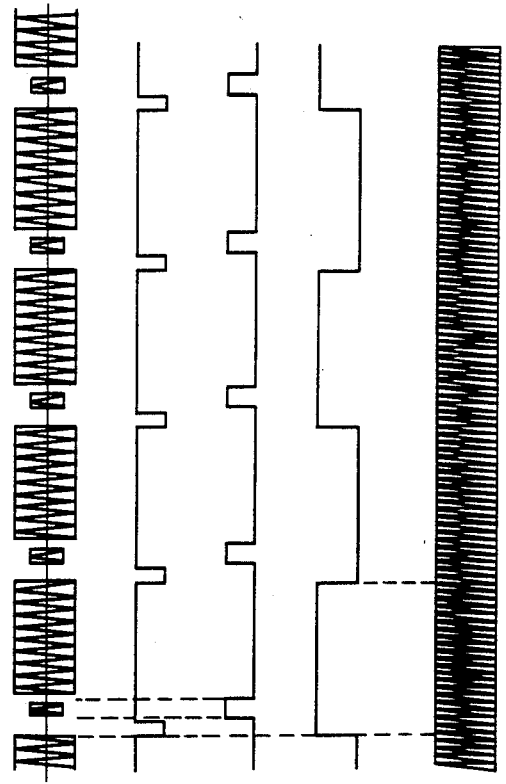

COLOR TELEVISION SIGNAL CONVERTING CIRCUIT

This application is generally related to co-pending U.S. application Ser. No. 476,403, entitled "Color Television Signal Conversion Device", and filed on Mar. 17, 1983 and to co-pending U.S. application Ser. No. 476,401, entitled "Signal Converter Circuit For Color TV", and filed on Mar. 17, 1983.

BACKGROUND OF THE INVENTION

This invention generally relates to a color television (TV) signal converting circuit and, more particularly, to a PAL/NTSC color TV signal converting circuit that is preferably assembled in a video disc reproducing apparatus or a video tape recorder (VTR).

As is known in the art, the color TV signal of an NTSC TV system is composed of a luminance signal, as well as a carrier chrominance (referred to as a "chroma") signal, wherein two color difference signal components (R-Y and B-Y) of the carrier chrominance signal are quadrature-modulated on the sub-carrier.

When this NTSC TV signal is to be recorded on the recording medium, e.g., a video disc, the frequency of the carrier chroma signal is required to be converted into a lower frequency (e.g., 1.53 MHz) than the original (standard) one (e.g., 3.58 MHz), because restrictions exist in the available frequency band of the recording medium. Accordingly, when the picked up signals from the video disc are reproduced, a known reproducing system of the video disc recorded by the general NTSC system will be described with reference to FIG. 1.

The composite color TV signal which is detected from a video disc (not shown) and is to be reproduced is separated by a filter (not shown) into a chroma signal and a luminance signal, the latter of which has a synchronization signal (referred to as a "sync"). The chroma signal Ch and the luminance signal Y are applied to input terminals 11 and 12, respectively. The chroma signal Ch applied to the input terminal 11 is frequency-interleaved with the luminance signal (Y signal) as follows:
$195/2 \cdot fH = 1.534091$ (MHz),
where fH is the line frequency. To convert the 1.53 MHz chroma signal into the 3.58 MHz chroma signal before the 1.53 MHz chroma signal is converted to a lower frequency, the 1.53 MHz chroma signal is supplied to a frequency converter 13 and is multiplied with a 5.11 MHz (1.53+3.58) continuous wave signal (referred to as a "CW signal"). The 5.11 MHz CW signal is supplied from a voltage controlled oscillator 14. An output signal from the frequency converter 13 is supplied to a 3.58 MHz band-pass filter 15 which then produces a 3.58 MHz NTSC chroma signal. This 3.58 MHz chroma signal and the Y signal applied to the input terminal 12 are mixed by a mixer 16. An NTSC color TV signal then appears at an output terminal 17.

Meanwhile, a timing error of a signal component occurs in a video disc player due to the wow and flutter of a turntable. A small frequency fluctuation occurs in the 1.53 MHz carrier signal. An automatic phase control (APC) loop is therefore incorporated to eliminate such a fluctuation. The chroma signal the frequency of which is converted into 3.58 MHz is supplied to a phase comparator 18 and is then compared with a 3.58 MHz reference signal during a burst period. The 3.58 MHz reference signal is supplied from an oscillator 19. A sync signal is separated by a sync separator 20 from the Y signal applied to the input terminal 12 and is supplied to a burst gate pulse generator 21 which then produces a burst gate pulse at its output end. An output signal from the phase comparator 18 is held by a sample and hold circuit 22 for a 1 line period (1H period) and is then supplied to an oscillating frequency control terminal of the 5.11 MHz VCO 14 through a low-pass filter 23.

Meanwhile, a PAL color TV signal has, in addition to the Y-signal, two color difference signals which quadrature-modulate the sub-carrier in the same manner as the NTSC color TV signal. However, in the PAL color TV signal, the R-Y component is phase-inverted for every successive horizontal line. The carrier frequency fsc of the PAL signal is generally 4.43 MHz.

An example of a demodulation circuit for demodulating the PAL color TV signal is illustrated in FIG. 2. Referring to FIG. 2, a PAL composite TV signal is supplied to an input terminal 25 and is separated by a Ch-Y separator 26, so that the Y signal appears on a signal line 27 and a chroma signal appears on a signal line 28. This chroma signal is added by an adder 30 to a 1H-delayed chroma signal produced from a 1 line delay line 29. At the same time, the chroma signal appearing on the signal line 28 is subtracted by a subtractor 31 from the 1H-delayed chroma signal. As a result, the adder 30 produces a B-Y component and the subtractor 31 produces an R-Y component. The B-Y and R-Y components are supplied to a B-Y demodulator 32 and an R-Y demodulator 33, respectively. The signal line 28 is connected to a local sub-carrier generator 35 through a burst phase discriminator 34. A 4.43 MHz reference subcarrier is supplied from the local sub-carrier generator 35 to the B-Y demodulator 32 through a 90° phase changing circuit 36 and, at the same time, is supplied to the R-Y demodulator 33 through a line changeover switch 37. The polarity of the R-Y component is inverted for every successive line, so that the phase of the reference sub-carrier applied to the R-Y demodulator 33 must be shifted by 180° for every 1H. The line changeover switch 37 has a 180° phase changing circuit 371 and a changeover switch 372. The switch 372 is then switched between a signal line 381 for a 180° phase-shifted signal and a signal line 382 for a direct signal. The switching operation of the switch 372 is controlled by a line switching signal from a flip-flop 40 which receives the sync signal separated from the Y signal applied to the input terminal 25 by a sync separator 39. The sync detected signals from the B-Y and R-Y demodulators 32, 33 are supplied to a matrix circuit 41 which then produces a blue signal B, a green signal G and a red signal R.

However, when a PAL color TV receiver receives an NTSC signal, the NTSC luminance may be perceived as being of unnatural brightness, due to differences between standards used in the PAL and NTSC systems. For example, the number of scanning lines in the NTSC system is 525, whereas the number of scanning lines in the PAL system is 625. In the above-mentioned case, although the vertical width is contracted, marginal reproduction can be performed. However, the color signal processing systems of the PAL and NTSC chroma signals differ from each other, thus disabling reproduction.

A commercial demand is expected to arise for reproduction of an NTSC signal by a PAL color TV receiver in European countries where the PAL system is adopted. A commercial demand is also expected to arise for reproduction of a PAL signal by an NTSC color TV receiver. To satisfy these commercial demands, a method currently used in satellite broadcasting systems is proposed wherein an NTSC color TV signal is completely demodulated and the demodulated signal is converted to a PAL color TV signal so as to allow reproduction by the PAL color TV receiver, and vice versa.

However, in the case of reproducing an NTSC video disc by a PAL color TV receiver, the method used in the above-mentioned satellite broadcasting systems is difficult to apply to an electrical appliance such as a video disc player which is subject to restrictions as to, for example, its circuit scale and retail price.

SUMMARY OF THE INVENTION

It is an object of the present invention to provide a color TV signal converting circuit by which a color TV signal of the NTSC TV system can be converted into that of the PAL TV system, and vice versa.

It is a further object of the present invention to provide a PAL/NTSC color TV signal converting circuit that is applicable to a video signal reproducing appliance such as a video disc player, whereby a video signal picked up from the disc, of which the carrier chroma frequency has been down-converted and recorded in an NTSC TV signal on the disc, and vice versa, can be converted into the corresponding PAL or NTSC TV signal, this TV signal being reproduced by a commercially available PAL or NTSC color TV receiver.

A color TV signal converting circuit according to the invention comprises: first signal generating means for generating a color television signal including at least a luminance signal and a first carrier chrominance signal of which frequency has been converted into a lower one than the standard carrier frequency and on which two color signal components (B-Y) and (R-Y) are quadrature-modulated;

chrominance/luminance signals separator means connected to receive said color television signal and separating the same into the luminance signal and the first carrier chrominance signal;

luminance signal processing means for separating a line synchronization signal from said luminance signal and producing from the line synchronization signal a burst gate pulse signal and a switching control signal of which frequency is identical to a half frequency of said line synchronization signal;

frequency converting means for converting said first carrier chrominance signal into a second carrier chrominance signal having the standard carrier frequency by mixing a predetermined local frequency signal derived from controllable oscillator means;

burst signal processing means including 45 degrees phase shift means and first switching means having a first signal terminal connected via said phase shift means to said frequency converting means, and a second signal terminal connected between said frequency converting means and the input of said phase shift means, said burst signal processing means being controlled by said burst gate signal in such a manner that during the color burst period, only the color burst signal contained in said second carrier chrominance signal is phase-shifted by 45 degrees by said phase shift means so as to deliver a third carrier chrominance signal of which color burst signal is delayed with respect to the (B-Y) axis;

a second signal generator means for producing a second carrier signal of which frequency is twice as high as said standard carrier frequency;

means for producing a DC level;

first adding means in which said second carrier signal is added to said DC level under the first predetermined adding ratio to produce a modulating signal;

modulator means for modulating said third carrier chrominance signal by said modulating signal;

band pass filtering means for filtering only the (R-Y) signal component from the modulated third carrier chrominance signal;

second switching means connected to said band pass filtering means and controlled by said switching control signal derived from said luminance signal processing means in such a manner that it closes and opens alternately at every one line to deliver said (R-Y) signal component when closed; and second adding means in which said (R-Y) signal component of the modulated third carrier chrominance signal is added to said third carrier chrominance signal derived from said burst signal processing means under a second predetermined adding ratio.

According to the invention, when the color TV signal converting circuit is employed in, for example, a video disc player, a signal recorded by the NTSC system can be readily reproduced by a PAL color TV receiver. Furthermore, a signal recorded by the PAL system can also be readily reproduced by an NTSC color TV receiver.

Similarly, the complicated method used in a conventional satellite broadcasting system, wherein the NTSC color TV signal is completely demodulated and the demodulated signal is then converted into a PAL signal, the signal conversion can be easily performed by a simple color TV signal converting circuit according to the present invention.

BRIEF DESCRIPTION OF THE DRAWINGS

The invention is best understood by reference to the accompanying drawings, of which:

FIG. 3 is a block diagram of one embodiment of a color TV signal converting circuit according to the invention;

FIGS. 4a and 4b show vector graphs on the PAL TV system, and FIG. 4c shows a vector graph on the NTSC TV system;

FIGS. 5a to 5e show waveform charts for explaining the operation of the first embodiment shown in FIG. 3;

FIG. 8 is a block diagram of the FIG. 3 embodiment further including an additional phase shifter; and FIG. 9 is a block diagram of the FIG. 7 embodiment further including an additional phase shifter.

DETAILED DESCRIPTION OF THE PREFERRED EMBODIMENTS

Figure 1:
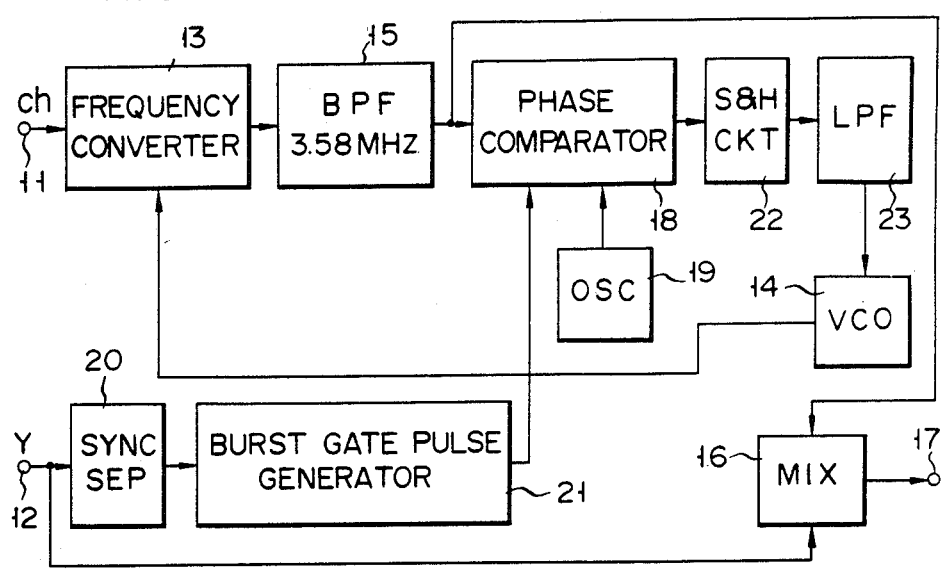
FIG. 1 is a block diagram of a conventional color TV signal converting circuit on the NTSC TV system that is adapted to the video disc.
Figure 2:
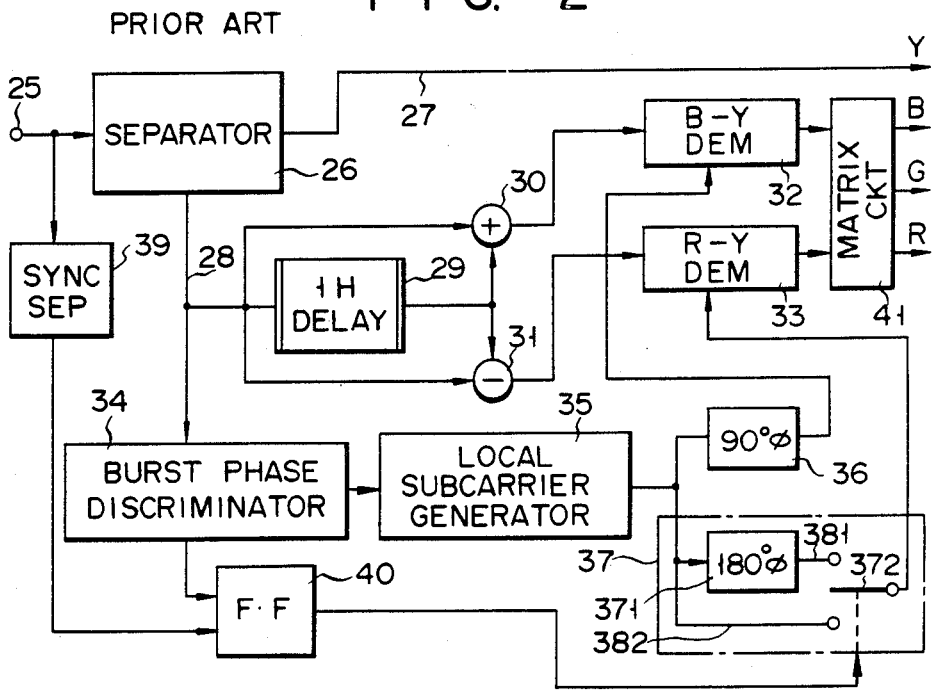
FIG. 2 is a block diagram of a known PAL demodulator.

The preferred embodiment of the color TV signal converting circuit may now be described with reference to FIGS. 3 to 5, in which FIG. 3 shows a block diagram of the converting circuit, and FIGS. 4 and 5 are a vector diagram and a waveform chart, respectively.

The signal format of the NTSC video disc will be described before the preferred embodiments thereof are described, to facilitate a better understanding of the present invention. A line frequency fH is 15.734 kHz, the number of scanning lines is 525 and a field frequency fV is 59.93 Hz. A sub-carrier frequency fD of a chroma signal converted to a low frequency is 1.53409 MHz ($=\frac{1}{2} \cdot fH \times 195$). As previously mentioned, the chroma signal is converted to a higher frequency 3.58 MHz chroma signal by the reproducing player.

A horizontal period (1H) of the NTSC TV signal is 63.56 μsec, whereas a horizontal period (1H) of the PAL TV signal is 64 μsec. The rotational frequency of the disc of the video disc player must be reduced to 0.9931 (=63.56/64) times its value, so as to match the period of the NTSC TV signal with that of the PAL TV signal. In the general PAL TV system used in European countries, the line frequency fH is 15.625 KHz, the field frequency fV is 50 Hz, the number of scanning lines is 625 and the horizontal sync period is 64 μsec; whereas, in the NTSC TV system, the line frequency is 15.734 kHz, the field frequency fV is 59.93 Hz, the number of scanning lines is 525 and the horizontal period is 63.56 μsec.

To convert the horizontal sync period (1H=63.56 μsec) of the NTSC TV system to that of the PAL TV system (1H=64 μsec), the rotational frequency of the NTSC video disc must be reduced to 0.9931 (=63.56/64) times its value. In other words, to display a signal reproduced from the NTSC video disc on a screen of the PAL color TV receiver, the rotational frequency of the video disc player must be decreased to 0.9931 times its value. The line frequency fH (15.734 kHz) of the NTSC color TV signal can then be converted to that (15.625 kHz) of the PAL color TV signal.

This can be achieved by changing an oscillating frequency of the reference oscillator in a circuit for controlling rotation of the turntable motor to be described later. As a result, any frequency (line frequency and chroma signal frequency), other than the field frequency fV of the NTSC TV signal, can be converted to that of the PAL TV signal.

The frequencies of the signal components of the NTSC video disc and the frequencies of these signal components upon conversion to PAL signal components are shown in Table 1, by way of comparison.

TABLE 1

|  | NTSC | PAL-Converted |
|---|---|---|
| Line Frequency fH | 15.734 kHz | 15.625 kHz |
| Number of Scanning Lines | 525 | 525 |
| Field Frequency fV (= (2/525) · fH) | 59.93 Hz | 59.52 Hz |
| Sub-carrier Frequency (Converted into Low Frequency) | 1.53409 MHz | 1.52343 MHz |

In the following description, it is assumed that the rotational frequency (NTSC) is decreased to 0.9931 times its value (i.e., the NTSC signal components are converted to the PAL signal components).

The difference between the PAL chroma signal and the NTSC chroma signal will be briefly described with reference to FIG. 4. In the PAL TV system, the two chroma components B-Y and R-Y are simultaneously transmitted in the same manner as in the NTSC TV system. However, the polarity of the R-Y component is inverted for every successive horizontal line. The R-Y and B-Y components quadrature-modulate the subcarrier signal. The PAL TV signal is illustrated by a vector diagram, such that the R-Y component has a phase for a given horizontal line, as shown in FIG. 4a, and has an inverted phase for the next horizontal line, as shown in FIG. 4b. Furthermore, a burst signal Bu is phase-shifted by 45° with respect to the B-Y axis.

The B-Y and R-Y components of the NTSC TV signal quadrature-modulate the sub-carrier signal and are designated by the same vectors for each line, as shown in FIG. 4c. The phase of a burst signal Bu is shifted by 180° with respect to the B-Y axis.

To play back the video disc recorded using the NTSC TV system by the PAL disc player, the 1.52 MHz chroma signal converted to a low frequency must be converted to a 4.43 MHz PAL chroma signal and the phase of the NTSC burst signal must be shifted by 45° with respect to the B-Y axis for each successive line. A color TV signal converting circuit, as shown in FIG. 3, is one preferred embodiment which achieves the above objective.

Before proceeding with the preferred embodiments, the principle operation of the present invention will be simply explained as follows.

The color TV signal converting circuit according to the invention can convert the color TV signals of an NTSC TV system which have been recorded on a recording medium, the carrier chroma frequency of which has been lowered from the nominal (standard) one (=3.58 MHz) to that of a PAL TV system, and vice versa.

To accomplish this, the above-mentioned low carrier chroma signal frequency is up-converted, for example, to the nominal one of the PAL TV system (=4.43 MHz). On the other hand, there is provided sub-carrier oscillation which is doubled (8.86 MHz) and is then added at the predetermined level of the DC component, so as to obtain a modulating signal. After conversion of the carrier chroma signal (NTSC system) and phase-shifting of the color burst signal during the burst period, the converted carrier chroma signal is modulated by the above-mentioned modulating signal. The resultant modulated signal is filtered by a band pass filter of a 4.43 MHz band width to output only the (R-Y) color signal component. This (R-Y) color signal component is added to the abovementioned converted carrier chroma signal during every one line, so as to finally obtain a PAL color TV signal, without containing the luminance signal.

According to another principle of the invention, it is also possible to obtain the (R-Y) color signal component. That is; first, the above-mentioned converted carrier chroma signal is modulated by only the above-mentioned doubled subcarrier (=8.86 MHz), secondly the modulated signal is added to the original converted carrier chroma signal under the predetermined adding ratio and, finally, the resultant added signal is filtered by the same band pass filter to deliver only the (R-Y) color signal component.

FIG. 3 shows a block diagram of a color TV signal converting circuit according to the invention.

The numeral 45 denotes a motor drive circuit for controlling a turn table motor 46 by adjusting a time constant consisting of a resistor R and a capacitor C. The turn table motor 46 rotates a turn table 47 at the predetermined constant speed, on which a video disc 48 is mounted. A signal recorded on this video disc 48 is picked up by a proper means, e.g., a laser to be transmitted to a signal processing circuit 49. This picked up signal is processed in the signal processing circuit 49, so as to produce a color TV signal to be reproduced. After separating this TV signal into a carrier chroma (Ch) signal and a luminance (Y) signal by a separating filter 50, the resultant signals are supplied to a chroma signal input 51 and a luminance signal input 52, respectively. The chroma signal input terminal 51 receives a first chroma signal Ch (1.52 MHz). A frequency converter 53 is arranged to convert the first 1.52 MHz chroma signal to a second 4.43 MHz chroma signal. A CW signal having a frequency of 5.95 MHz (=1.52+4.43) is supplied from a voltage controlled oscillator 54 as a first carrier signal generating means to the frequency converter 53. The frequency converter 53 multiplies the 1.52 MHz chroma signal and the 5.95 MHz CW signal together, and produces the second 4.43 MHz chroma signal. The second chroma signal is then supplied to a subtractor (not shown) through a 1H delay line (not shown). The subtractor subtracts the second chroma signal (direct signal) from the frequency converter 53 from the 1H-delayed second chroma signal, through the 1H delay line, thus completely eliminating the luminance component. It should be noted that the "direct signal" is understood as such a signal that is neither delayed nor processed in the specification. The 4.43 MHz output from the frequency converter 53 is supplied to a 4.43 MHz band-pass filter 55. Since there exists a timing error of the picked up signal which is caused by wow and flutter, or the like, of the turntable 47 in the video player, a small frequency fluctuation is present in the 1.52 MHz chroma signal. An APC loop is arranged to eliminate such a frequency fluctuation. An output signal from the band-pass filter 55 is supplied to a phase comparator 56 and its phase is compared by the phase comparator 56 with a 4.43 MHz CW signal as a third carrier signal during a burst period. The 4.43 MHz CW signal is oscillated by a 4.43 MHz oscillator 57. Meanwhile, a sync signal is separated by a sync separator 60 from the luminance or Y signal applied to the input terminal 52 and this sync signal is delayed and shaped by a burst gate pulse generator 61 which then produces the burst gate pulse. An output from the phase comparator 56 is then supplied to a sample and hold circuit 58. The sample and hold circuit 58 then holds the output from the phase comparator 56 for a 1H period and supplies it to a low-pass filter 59. An output from the low-pass filter 59 is supplied to the VCO 54, thereby controlling the oscillating frequency thereof.

The output signal shown in FIG. 5a, which is supplied from the band-pass filter 55, is supplied to a switch 64 through a 45° phase shift circuit 62 and a signal line 63. The switch 64 has a stationary contact X1 connected to the 45° phase shift circuit 62, a stationary contact X2 connected to the signal line 63 and a movable contact X3 connected to an output line 65. The contact X3 is selectively connected to one of contacts X1 and X2. The switching operation is controlled by the output signal shown in FIG. 5c, which is supplied from the burst gate pulse generator 61. The switch 64 delays only the phase of the burst signal Bu (FIG. 4c) by 45°. The output signal (i.e., the third chroma signal) from the switch 64 is supplied to an adder 66 through an output line 65.

Meanwhile, the output signal from the 4.43 MHz oscillator 57 is supplied to a doubler 67 which then produces an 8.86 MHz continuous wave signal (referred to as a "CW signal"). The 8.86 MHz CW signal, as shown in FIG. 5e, is supplied to an adder 68. A bias source 69 is connected to the adder 68 so as to superpose a DC component on the 8.86 MHz CW signal. An output signal from the adder 68 is supplied to one input end of a modulator 70. As will be described later, modulator 70 is a double balanced modulator. As is known to those skilled in the art, such double-balanced modulators require a DC bias. The output signal from the switch 64 is supplied to the other input end of the modulator 70. An output signal from the modulator 70 is supplied to a line change switch 72 through a 4.43 MHz band-pass filter 71. The output end of the line change switch 72 is connected to the adder 66. The line change switch 72 connects the band-pass filter 71 with the adder 66 for every other line. This switching operation is controlled by an output signal (control signal; as shown in FIG. 5d) from an oscillator 73 connected to the sync separator 60. This control signal is synchronized with the horizontal sync signal and has a frequency equal to half of the line frequency fH. The oscillator 73 may be realized by a flip-flop which is driven by, for example, the horizontal sync signal. The adder 66 produces a PAL-converted signal as the output signal. (The reason for conversion will be described later.) The converted signal is then supplied to a mixer 74 for mixing the chroma signal and the luminance signal. Since the Y signal applied to the input terminal 52 is also supplied to the Ch-Y mixer 74 through a signal line 75, the Ch-Y mixer 74 produces a Ch-Y composite signal at an output terminal 76. This composite signal may be reproduced by a commercially available PAL color TV receiver.

The operation of the signal converting circuit having the arrangement described above according to the present invention will be described with reference to FIGS. 5a to 5e. As previously stated, FIGS. 5a to 5e show waveforms of the signals at points ⓐ to ⓔ in the circuit shown in FIG. 3. FIG. 5a shows the chroma signal as the output from the band-pass filter 55; FIG. 5b shows the horizontal sync signal as the output from the sync separator 60; FIG. 5c shows the burst gate pulse as the output from the burst gate pulse generator 61; FIG. 5d shows the line switching signal as the output from the flip-flop 73; and, FIG. 5e is the 8.86 MHz CW signal, the output from the doubler 67.

The PAL TV signal shown in FIGS. 4a and 4b and the NTSC TV signal shown in FIG. 4c, respectively, have the Y signal and two color difference signals which modulate the sub-carrier, as previously mentioned. The NTSC chroma signal is given by equation (1), as follows:

$$EN = (ER - EY)\cos \omega_{sc}t + (EB - EY)\sin \omega_{sc}t \quad (1),$$

where $\omega_{sc}$ is the angular frequency of the sub-carrier. The PAL chroma signal is given as follows, since the $ER - EY$ component is inverted for each successive line:

$$EP = (ER - EY)\cos \omega_{sc}t + (EB - EY)\sin \omega_{sc}t \quad (2)$$

$$EP' = -(ER-EY)\cos\omega sct + (EB'EY)\sin\omega sct \qquad (3)$$

The minus sign in equation (3) indicates the inverted polarity. Equation (2) is completely the same as equation (1). To convert the NTSC signal components to PAL signal components, the original signal in equation (1) and the signal indicated by equation (3) are alternately switched over for every one line, so as to coincide with the signal component shown in equation (3).

The burst signal BU of the PAL signal is shifted by 45° with respect to the B-Y axis, as shown in FIG. 4a or 4b. Thus, only the burst signal BU is extracted from the NTSC signal, and is shifted by 45° and delayed before the NTSC signal is converted to the PAL signal.

The operation of the color TV signal converting circuit will be described in terms of the above-mentioned assumptions. The first carrier chroma signal Ch reproduced from the video disc 48 and supplied to the input terminal 51 has a frequency of 1.52 MHz ($=1.53\times0.9931$), since the rotational frequency of the video disc 48 is decreased to 0.9931 times that of the NTSC TV system. The 1.52 MHz chroma signal is then multiplied by the frequency converter 53 with the 5.95 MHz CW signal from the VCO 54 as the first carrier signal generator. The frequency converter 53 then produces the 4.43 MHz chroma signal (second carrier chroma signal). This 4.43 MHz chroma signal is produced through the 4.43 MHz band-pass filter 55 (FIG. 5a). It should be noted that the phase comparator 56, the sample and hold circuit 58, and the low-pass filter 59 constitute the above-described APC loop which eliminates the frequency fluctuation caused by the wow and flutter of the turntable.

The 4.43 MHz chroma signal from the band-pass filter 55 is supplied to the switch 64 through the signal line 63 and the signal path of the 45° phase shift circuit 62 for phase-shifting the burst signal by 45°. The switch 64 is switched by the burst gate pulse (FIG. 5c). The contact X1 of the switch 64 is connected to the contact X3 only during the burst period and the contacts X2, X3 thereof are connected to each other during any period other than the burst period. Therefore, the switch 64 only phase-shifts the burst signal by 45°, thereby obtaining the third chroma signal shown in the vector diagram in FIG. 4a.

Meanwhile, the output signal from the 4.43-MHz oscillator 57 is supplied to the doubler 67, which then produces the 8.86 MHz CW signal (FIG. 5e). The 8.86 MHz CW signal is then added by the adder 68 to a DC component from the DC bias source 69, so that a predetermined DC component is superposed on the 8.86 MHz CW signal. The 8.86 MHz CW signal on which the DC component is superimposed, is then analog-multiplied by the modulator 70 with the output signal from the switch 64. The third chroma signal at an output end of the switch 64 is the same as the NTSC TV signal EN given by equation (1). An output E1 from the adder 68 may be given by equation (4), as follows:

$$E1 = \tfrac{1}{2} + \cos 2\omega sct \qquad (4),$$

where $\omega sc$ is the angular frequency of the sub-carrier (fSC=4.43 MHz).

When the signals shown in equations (1) and (4) are each multiplied by the modulator 70, an output E2 from the modulator 70 is given by equation (5) as follows:

$$\begin{aligned}
E2 &= \{(ER\text{-}EY)\cos\omega sct + (EB\text{-}EY)\sin\omega sct\} \times \\
&\qquad (1/2 + \cos 2\omega sct) \\
&= (1/2)\{(ER\text{-}EY)\cos\omega sct + (EB\text{-}EY)\sin\omega sct\} + \\
&\quad (1/2)\{(ER\text{-}EY)\cos\omega sct - (EB\text{-}EY)\sin\omega sct + \\
&\qquad (ER\text{-}EY)\cos 3\omega sct + (EB\text{-}EY)\sin 3\omega sct\}
\end{aligned} \qquad (5)$$

The output signal from the modulator 70 is supplied to the 4.43 MHz band-pass filter 71 for extracting the sub-carrier component, so that the (3ωsc) component is eliminated from equation (5). The band-pass filter 71 produces an output E3 given by equation (6), as follows:

$$\begin{aligned}
E3 &= (1/2)\{(ER\text{-}RY)\cos\omega sct + (EB\text{-}EY)\sin\omega sct\} + \\
&\quad (1/2)\{(ER\text{-}EY)\cos\omega sct - (EB\text{-}EY)\sin\omega sct\} \\
&= (ER\text{-}EY)\cos\omega sct
\end{aligned} \qquad (6)$$

The output signal E3 indicates that the B-Y component is eliminated and that only the R-Y component is extracted. The R-Y component is supplied to the adder 66 through the line change switch 72. Since the line change switch 72 is connected/disconnected for each successive line, in accordance with the output signal (FIG. 5d) from the oscillator 73, the adder 66 intermittently receives the R-Y component.

The adder 66 adds the original NTSC signal EN from the switch 64 and the output signal E3 from the line changeover switch 72 at a predetermined ratio and polarity. More specifically, the ratio in which the output signal EN from the switch 64 is added to the output E3 from the line change switch 72 is set at 1:−2. When the line change switch 72 is opened (OFF), the output from the adder 66 corresponds to the signal given by equation (1) or (2). However, when the line changeover switch 72 is closed (ON), the output from the adder 66 corresponds to a signal E4 given by equation (7), as follows:

$$\begin{aligned}
E4 &= EN + (-2 \cdot E3) \\
&= -(ER\text{-}EY)\cos\omega sct + (EB\text{-}EY)\sin\omega sct
\end{aligned} \qquad (7)$$

Equation (7) is the same as equation (3). Therefore, the adder 66 alternately delivers the signal given by equation (1) or (2) and the signal given by equation (3), for each successive line. The NTSC TV signal is thus converted to the PAL TV signal.

The PAL-converted chroma signal is synchronized by the Ch-Y mixer 74 with the Y signal supplied to the input terminal 52, thereby obtaining a predetermined PAL TV signal.

The carrier chroma signal can thus be easily converted by adding only a simple circuit.

Figure 6:
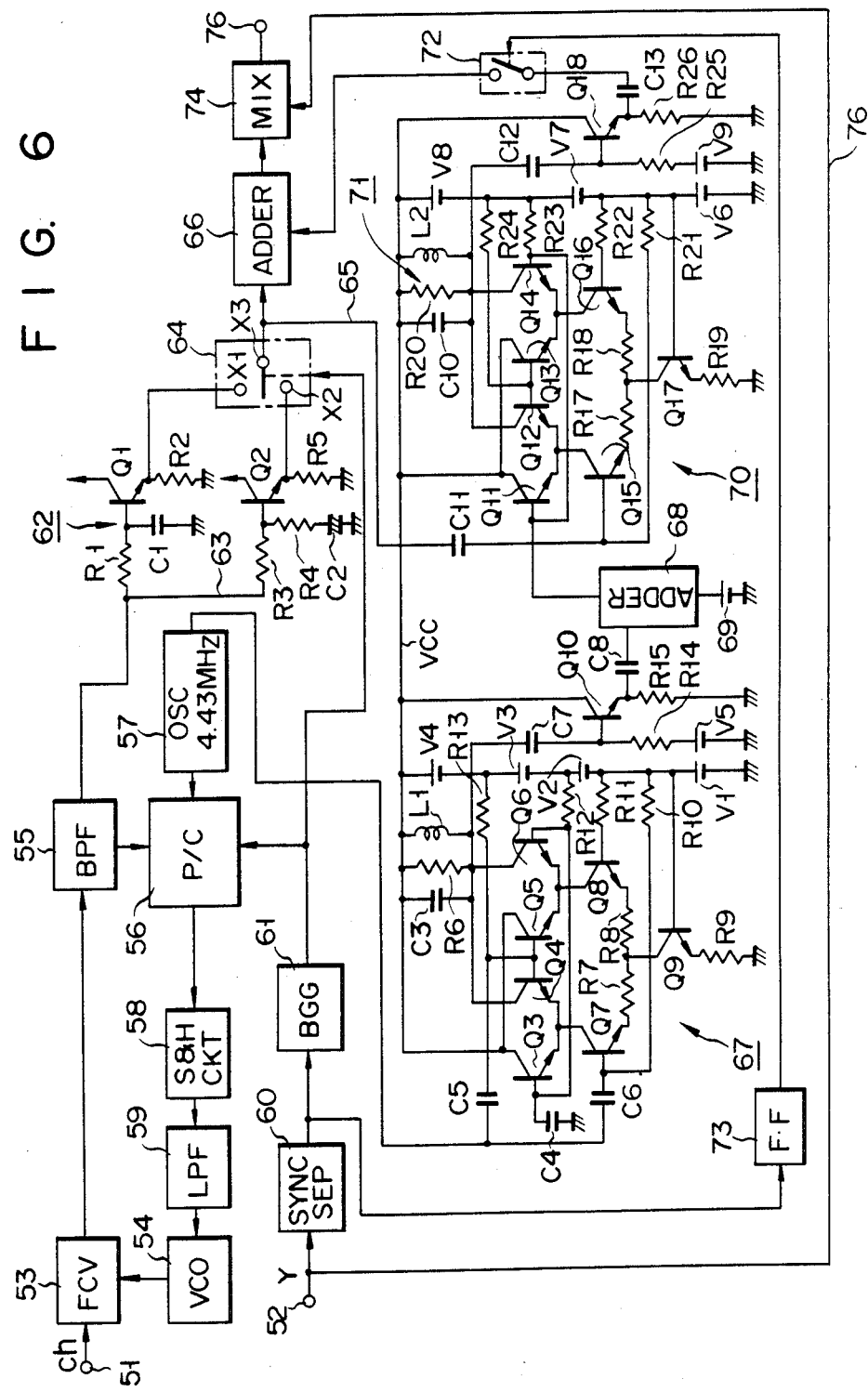
FIG. 6 partially shows a circuit diagram of the major components belonging to the first embodiment in FIG. 3.

FIG. 6 is a circuit diagram showing the detailed arrangement of the circuit shown in FIG. 3. More particularly, FIG. 6 shows detailed connections of the 45° phase shift circuit 62, the modulator 70, the doubler 67 and the band-pass filter 71.

Referring to FIG. 6, the phase shift circuit 62 comprises a transistor Q1 and a low-pass filter of a resistor R1 and a capacitor C1. The base of the transistor Q1 is connected to the low-pass filter, the collector thereof is connected to a voltage source (not shown) and the emitter thereof is grounded through a resistor R2. The emitter of the transistor Q1 is connected to the contact X1 of the switch 64. The resistor R1 and the capacitor C1 phase-shift the burst signal by 45°. During this phase-shifting operation, the gain is attenuated by about 3 dB. To match the gain of the signal from the signal line 63 with the gain of the low-pass filter, the signal from the signal line 63 is supplied to a transistor Q2 through an attenuator consisting of resistors R3 and E4. The emitter of the transistor Q2 is connected to the contact X2 of the switch 64. The collector of the transistor Q2 is connected to the voltage source (not shown) and the emitter thereof is grounded through a resistor R5. The resistor R4 is grounded through a capacitor C2 used for blocking the DC component.

The doubler 67 comprises a doubly balanced modulator. The doubly balanced modulator comprises transistors Q3 and Q4, which constitute a first differential amplifier; transistors Q5 and Q6, which constitute a second differential amplifier; constant current source transistors Q7 and Q8, respectively, for the first and second differential amplifiers; and, a constant current source transistor Q9 for transistors Q7 and Q8. The emitters of transistors Q7 and Q8 are connected to the collector of transistor Q9 through resistors R7 and R8, respectively. The emitter of transistor Q9 is grounded through a resistor R9. The collectors of transistors Q3 and Q5 are connected to each other, and a common node thereof is connected to a voltage source line VCC. The collectors of transistors Q4 and Q6 are connected to each other. A tank circuit of an inductor L1, a resistor R6 and a capacitor C3 are connected as a load between the node of the collectors of transistors Q4 and Q6, and the voltage source line VCC. A plurality of bias sources V1, V2, V3 and V4 are arranged between the source line VCC and the ground. A voltage from the bias source V1 is applied to the base of transistor Q9 and to the base of transistors Q7 and Q8, through resistors R10 and R11, respectively. A voltage from the bias source V2 is applied to the bases of transistors Q3 and Q6 through resistor R12. A voltage from the bias source V3 is applied to the bases of transistors Q4 and Q5 through resistor R13. The bases of the transistors Q3 and Q6 are grounded through a capacitor C4.

The 4.43 MHz CW signal from the oscillator 57 is supplied to the bases of transistors Q4 and Q5 through capacitor C5 and to the base of transistor Q7 through capacitor C6. The 8.86 MHz CW signal appears at the collectors of transistors Q4 and Q6. The phase of the 8.86 MHz CW signal can be properly adjusted by using a variable inductor as the inductor L1. The 8.86 MHz CW signal is supplied to the adder 68 through capacitor C7, transistor Q10 and capacitor C8. The base of transistor Q10 is connected to a bias source V5 through resistor R14, the collector thereof is connected to the source line VCC and the emitter thereof is grounded through resistor R15.

The modulator 70 similarly comprises a doubly balanced modulator. This doubly balanced modulator comprises transistors Q11 and Q12, which constitute a first differential amplifier; transistors Q13 and Q14, which constitute a second differential amplifier and constant current source transistors Q15 and Q16, respectively, for the first and second differential amplifier; and, a constant current source transistor Q17 for transistors Q15 and Q16. The emitters of transistors Q15 and Q16 are connected to the collector of transistor Q17 through resistors R17 and R18, respectively. The emitter of transistor Q17 is grounded through resistor R19. The collectors of transistors Q11 and Q13 are connected to each other and a common node thereof is connected to the source line VCC. The collectors of transistors Q12 and Q14 are connected to each other. A band-pass filter 71 of an inductor L2, a resistor R20 and a capacitor C10 are connected between the source line VCC and the common node of the collectors of transistors Q12 and Q14. A plurality of bias sources V6, V7 and V8 are arranged between the source line VCC and the ground. A voltage from the bias source V6 is applied to the base of transistor Q17, and to the bases of transistors Q15 and Q16, through resistors R21 and R22, respectively. A voltage from the bias source V7 is applied to the bases of transistors Q11 and Q14, through a resistor R23, and to the bases of transistors Q12 and Q13, through another resistor R24.

The original signal (FIG. 5a), as the output from the switch 64, is supplied to the base of the transistor Q15 through a capacitor C11. The output signal from the adder 68 is supplied to the bases of transistors Q11 and Q14. The signal given by equation (6) is produced from the collectors of transistors Q12 and Q14. This signal is supplied to the line changeover switch 72 through capacitor C12, transistor Q18 and capacitor C13. The base of transistor Q18 is connected to a bias source V9 through resistor R25, the collector thereof is connected to the source line VCC and the emitter thereof is grounded through resistor R26. It should be noted that capacitor C10, resistor R20 and inductor L2, which are connected to the collectors of transistors Q12 and Q14, constitute the 4.43 MHz band-pass filter 71.

Figure 7:
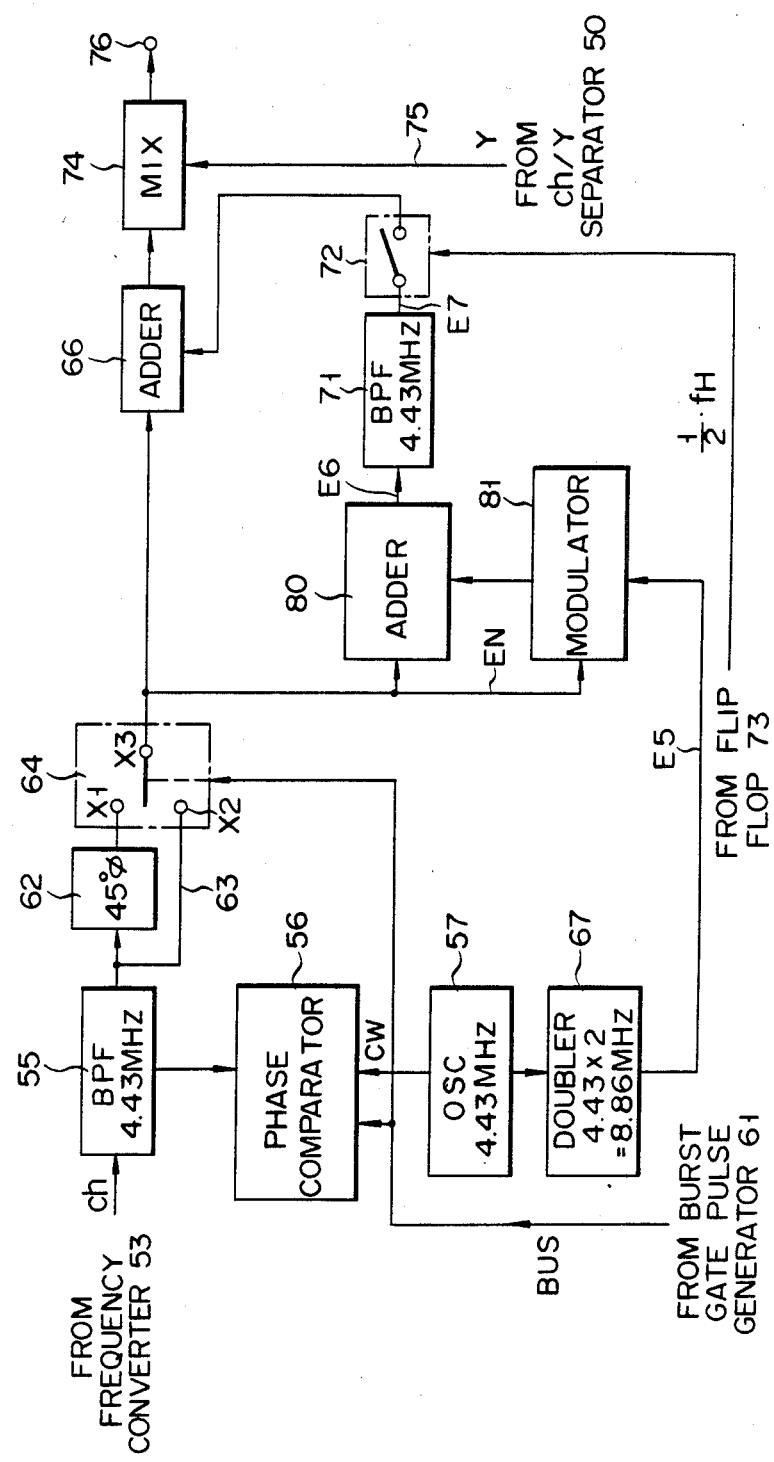
FIG. 7 is a block diagram of another embodiment according to the present invention in which only relevant components are disclosed.

FIG. 7 shows another embodiment of the present invention. The modulator 70 in FIG. 3 is replaced with an adder 80 and the adder 68 in FIG. 3 is replaced with a modulator 81. It should be understood that the remaining circuit elements and construction are identical to those of the first embodiment shown in FIG. 3 and, for the sake of simplicity, only the relevant circuit is shown in FIG. 7. The function of the modulator 81 is to multiply an output signal from a doubler 67 with an output signal (original signal) from a switch 64. The adder 80 adds the output signal from the switch 64 and an output signal from the modulator 81 at a predetermined ratio and polarity.

Referring to FIG. 7, the modulator 81 receives the output signal E5 from the doubler 67 and the output signal EN from the switch 64 and produces the multiplied signal given by equation (8), as follows:

$$EN \times E5 = \{(ER\text{-}EY)\cos\omega sct + (EB\text{-}EY)\sin\omega sct\} \times \cos 2\omega sct \quad (8)$$
$$= (1/2)\{(ER\text{-}EY)\cos\omega sct - (EB\text{-}EY)\sin\omega sct +$$
$$(ER\text{-}EY)\cos 3\omega sct + (EB\text{-}EY)\sin 3\omega sct\}$$

The signal given by equation (8) is added by the adder 80 to the original signal EN given by equation (1). In this case, the ratio in which the signal from the switch 64 is added to the signal from the modulator 81 is set at 1:2. An output E6 from the adder 80 is given by equation (9), as follows:

$$E6 = EN + (2 \times E5) \quad (9)$$
$$= (ER\text{-}EY)\cos\omega sct + (EB\text{-}EY)\sin\omega sct +$$
$$\{(ER\text{-}EY)\cos\omega sct - (EB\text{-}EY)\sin\omega sct +$$
$$(ER\text{-}EY)\cos 3\omega sct + (EB\text{-}EY)\sin 3\omega sct\}$$
$$= 2(ER\text{-}EY)\cos\omega sct + (ER\text{-}EY)\cos 3\omega sct + (EB\text{-}EY)\sin 3\omega sct$$

The signal E6 is supplied to the band-pass filter 71, which then eliminates the (3ωsc) component. The filter 71 thus produces an output signal E7 as follows:

$$E7 = 2 \cdot (ER\text{-}EY)\cos\omega sct \quad (10)$$

The signal E7 is supplied to the adder 66 through the line change switch 72. The adder 66 adds the signal from the switch 64 and the signal from the line change-over switch 72 in a ratio of 1:−1. When the line changeover switch 72 is opened (OFF), the adder 66 produces the signal given by equation (1). However, when the line changeover switch 72 is closed (ON), the adder 66 produces the signal given by equation (7) and, hence, equation (3). As a result, the adder 66 produces the PAL-converted chroma signal.

While the invention has now been described in terms of certain preferred embodiments, and exemplified with respect thereto, those of skill in the art will readily appreciate that various modifications, changes, omissions and substitutions may be made without departing from the spirit of the invention.

The band-pass filter 71 is interposed between the modulator 70 and the line change switch 72 in the circuit shown in FIG. 3. However, the present invention is not limited to the above configuration. For example, the band-pass filter 71 may be arranged between the line change switch 72 and the adder 66 or between the adder 66 and the Ch-Y mixer 74 to obtain the same effect as obtained in the above embodiment.

If the line change switch 72 is operated so as to be normally open (OFF), the PAL/NTSC signal conversion can be readily stopped.

Furthermore, the doubler 67 may comprise an 8.86 MHz oscillator and the 4.43 MHz oscillator 57 may comprise a ½ frequency divider.

The NTSC color TV signal is converted to the PAL color TV signal in the above embodiments. Furthermore, as stated at the beginning, the PAL color TV signal can be converted to the NTSC color TV signal. In this case, when the adder 66 receives the signal shown in FIG. 4a, the line change switch 72 may be opened (OFF). However, when the adder receives the signal shown in FIG. 4b, the line change switch 72 may be closed (ON). Furthermore, a phase shifter 101 (see FIGS. 8 and 9) for controlling the phase of the burst signal is arranged between the adder 66 and the Ch-Y mixer 74. In this manner, the circuit shown in FIG. 3 need only be slightly modified in order to convert the PAL signal to the NTSC signal.

The present invention has an advantage in that when the color TV signal converting circuit is used in in the video disc player, the signal recorded by the NTSC system can be reproduced by a PAL receiver and the signal recorded by the PAL system can be readily reproduced by an NTSC receiver.

The present invention has another advantage in that color TV signal conversion can be performed by use of a simple circuit, unlike the conventional method used in satellite broadcasting systems in which the NTSC color TV signal is completely demodulated and the demodulated signal is converted to the PAL color TV signal.

What we claim is:

1. A color television signal converting circuit comprising:
    first signal generating means for generating a color television signal including at least a luminance signal and a first carrier chrominance signal of which frequency has been converted into a lower one than the standard carrier frequency and on which two color signal components (B-Y) and (R-Y) are quadrature-modulated;
    chrominance/luminance signals separator means connected to receive said color television signal and separating the same into the luminance signal and the first carrier chrominance signal;
    luminance signal processing means for separating a line synchronization signal from said luminance signal and producing from the line synchronization signal a burst gate pulse signal and a switching control signal of which frequency is identical to a half frequency of said line synchronization signal;
    frequency converting means for converting said first carrier chrominance signal into a second carrier chrominance signal having the standard carrier frequency by mixing a predetermined local frequency signal derived from controllable oscillator means;
    burst signal processing means including 45 degrees phase shift means and first switching means having a first signal terminal connected via said phase shift means to said frequency converting means, and a second signal terminal connected between said frequency converting means and the input of said phase shift means, said burst signal processing means being controlled by said burst gate signal in such a manner that during the color burst period, only the color burst signal contained in said second carrier chrominance signal is phase-shifted by 45 degrees by said phase shift means so as to deliver a third carrier chrominance signal of which color burst signal is delayed with respect to the (B-Y) axis;
    a second signal generator means for producing a second carrier signal of which frequency is twice as high as said standard carrier frequency;
    means for producing a DC level;
    first adding means in which said second carrier signal is added to said DC level under a first predetermined adding ratio to produce a modulating signal;
    modulator means for modulating said third carrier chrominance signal by said modulating signal;
    band pass filtering means for filtering only the (R-Y) signal component from the modulated third carrier chrominance signal;
    second switching means connected to said band pass filtering means and controlled by said switching control signal derived from said luminance signal processing means in such a manner that it closes and opens alternately at every one line to deliver said (R-Y) signal component when closed; and
    second adding means in which said (R-Y) signal component of the modulated third carrier chrominance signal is added to said third carrier chrominance signal derived from said burst signal processing means under a second predetermined adding ratio.

2. A color television signal converting circuit as claimed in claim 1, further comprising;
    second phase shift means connected to the output of said second adding means, thereby shifting back by 45° the phase of the color burst signal from said burst signal processing means to the original phase thereof.

3. A color television signal converting circuit as claimed in claim 1, further comprising:
    second band pass filtering means connected between said frequency converting means and said burst signal processing means;
    phase comparator means for comparing the phase of said second carrier chrominance signal from said second band pass filtering means with that of a third carrier signal obtained from said second signal generator, of which frequency is identical to said standard carrier frequency, whereby said local frequency signal of the frequency converting means is controlled by said phase comparator means so as to cancel influence of the frequency fluctuation of said first carrier chrominance signal.

4. A color television signal converting circuit as claimed in claim 3, further comprising:
second phase shift means connected to the output of said second adding means, thereby shifting back by 45 degrees the phase of the color burst signal from said burst signal processing means to the original phase thereof.

5. Apparatus according to claim 1 wherein said second predetermined adding ratio is 1:−2 for said third carrier chrominance signal and said modulated third carrier chrominance signal, respectively.

6. A color television signal converting circuit comprising:
first signal generating means for generating a color television signal including at least a luminance signal and a first carrier chrominance signal of which frequency has been converted into a lower one than the standard carrier frequency and on which two color signal components (B-Y) and (R-Y) are quadrature-modulated;
chrominance/luminance signals separator means connected to receive color television signal and separating the same into the luminance signal and the first carrier chrominance signal;
luminance signal processing means for separating a line synchronization signal from said luminance signal and producing from the line synchronization signal a burst gate pulse signal and a switching control signal of which frequency is identical to a half frequency of said line synchronization signal;
frequency converting means for converting said first carrier chrominance signal into a second carrier chrominance signal having the standard carrier frequency by mixing a predetermined local frequency signal derived from controllable local oscillator means;
burst signal processing means including 45 degrees phase shift means and first switching means having a first signal terminal connected via said phase shift means to said frequency converting means, and a second signal terminal connected between said frequency converting means and the input of said phase shift means, said burst signal processing means being controlled by said burst gate signal in such a manner that during the color burst period, only the color burst signal contained in said second carrier chrominance signal is phase-shifted by 45 degrees by said phase shift means so as to deliver a third carrier chrominance signal of which color burst signal is delayed with respect to the (B-Y) axis;
a second signal generator means for producing as a modulating signal a second carrier signal of which frequency is twice as high as said standard carrier frequency;
modulator means for modulating said third carrier chrominance signal by said modulating signal;
first adding means in which said modulated third carrier chrominance signal is added to said third carrier chrominance signal from said burst signal processing means under a first predetermined adding ratio;
band pass filtering means connected to said first adding means and filtering only the (R-Y) signal component from said modulated and added third carrier chrominance signal;
second switching means connected to said band pass filtering means and controlled by said switching control signal derived from said luminance signal processing means in such a manner that it closes and opens alternately at every one line to deliver said (R-Y) signal component when closed; and
second adding means in which said (R-Y) signal component of the modulated and added third carrier chrominance signal is added to said third carrier chrominance signal derived from said burst signal processing means under a second predetermined adding ratio.

7. A color television signal converting circuit as claimed in claim 6, further comprising:
second phase shift means connected to the output of said second adding means, thereby shifting back by 45 degrees the phase of the color burst signal from said burst signal processing means to the original phase thereof.

8. A color television signal converting circuit as claimed in claim 6, further comprising:
second band pass filtering means connected between said frequency converting means and said burst signal processing means; and
phase comparator means for comparing the phase of said second carrier chrominance signal from said second band pass filtering means with that of a third carrier signal obtained from said second signal generator, of which frequency is identical to said standard carrier frequency, whereby said local frequency signal of the frequency converting means is controlled by said phase comparator means so as to cancel influence of the frequency fluctuation of said first carrier chrominance signal.

9. A color television signal converting circuit as claimed in claim 6, further comprising:
second phase shift means connected to the output of said second adding means, thereby shifting back by 45 degrees the phase of the color burst signal from said burst signal processing means to the original phase thereof.

10. Apparatus according to claim 6 wherein said second predetermined adding ratio is 1:−1 for said third carrier chrominance signal and said modulated and added third carrier chrominance signal, respectively.

* * * * *